United States Patent
Shirakawa

(10) Patent No.: US 8,203,485 B2
(45) Date of Patent: Jun. 19, 2012

(54) METHOD OF ESTIMATING DIRECTION OF ARRIVAL AND APPARATUS THEREOF

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 157 days.

(21) Appl. No.: 12/871,514

(22) Filed: Aug. 30, 2010

(65) Prior Publication Data

US 2011/0050500 A1    Mar. 3, 2011

(30) Foreign Application Priority Data

Sep. 1, 2009    (JP) ................ 2009-201624

(51) Int. Cl.
*G01S 5/02* (2010.01)
(52) U.S. Cl. ........................................... 342/417
(58) Field of Classification Search ............ 342/417
See application file for complete search history.

(56) References Cited

U.S. PATENT DOCUMENTS

| | | |
|---|---|---|
| 6,288,672 B1 | 9/2001 | Asano et al. |
| 6,351,238 B1 | 2/2002 | Kishigami et al. |
| 7,196,656 B2 | 3/2007 | Shirakawa |
| 7,574,333 B2 * | 8/2009 | Lu .................................. 703/2 |
| 2005/0285788 A1 | 12/2005 | Xin |
| 2006/0007043 A1 | 1/2006 | Xin |

FOREIGN PATENT DOCUMENTS

| | | |
|---|---|---|
| EP | 1777539 A1 | 4/2007 |
| EP | 2105758 A2 | 9/2009 |
| JP | 2000-155171 A | 6/2000 |
| JP | 2001-281316 A | 10/2001 |
| JP | 2004-104620 A | 4/2004 |
| JP | 2006-067869 A | 3/2006 |

OTHER PUBLICATIONS

Extended European Search Report, dated Nov. 26, 2010 for corresponding European Application No. 10174688.1, 8 pages.

* cited by examiner

*Primary Examiner* — Harry Liu
(74) *Attorney, Agent, or Firm* — Fujitsu Patent Center

(57) ABSTRACT

A method includes generating a correlation vector of baseband-signal vectors based upon signals received from a plurality of sensor devices, generating a generalized Hankel matrix R representing a covariance matrix to which a spatial averaging is applied based upon the correlation vector, generating a kernel matrix $\Omega_1$, which is a projection matrix onto noise subspace, by performing linear operation using submatrices $R_1$ and $R_2$ of the generalized Hankel matrix R, generating a kernel matrix $\Omega_2$, which is orthogonal with the kernel matrix $\Omega_1$, and estimating a direction of arrival of a signal based upon the kernel matrices $\Omega_1$ and $\Omega_2$.

12 Claims, 6 Drawing Sheets

METHOD OF ESTIMATING DIRECTION OF ARRIVAL AND APPARATUS THEREOF

CROSS-REFERENCE TO RELATED APPLICATIONS

This application is based upon and claims the benefit of priority of the prior Japanese Patent Application No. 2009-201624, filed on Sep. 1, 2009, the entire contents of which are incorporated herein by reference.

FIELD

The embodiments discussed herein relate to a technique for estimating a direction of arrival (DOA) of an incoming signal using a sensor array.

BACKGROUND

Typical methods of DOA estimation of a signal using a sensor array include digital beamforming (DBF), a subspace method (SSM), and maximum likelihood (ML) estimation. The DBF method includes a Capon method and linear prediction. The SSM includes multiple signal classification (MUSIC), estimation of signal parameters via rotation invariance techniques (ESPRIT), and a propagator method. The ML estimation includes a method of direction estimation (MODE).

In these methods, the estimation precision and the computation load increases in the following order: DBF<SSM<ML. With the SSM, there is a good balance between the computation load and the estimation precision and, thus, is the practical method to be chosen. However, when it is assumed that a central processing unit (CPU) of several tens of mega hertz (MHz) is to be used, it is difficult to perform real-time processing with the MUSIC or the ESPRIT because the computation load for eigenvalue decomposition, which is the main computation process required in the SSM, is large.

On the other hand, with the propagator method or an orthonormal propagator method, which is an improved version of the propagator method, real-time processing can be performed because the main computation process is merely calculation of inverse matrices, but sufficient estimation precision cannot be achieved.

SUMMARY

According to an aspect of the invention, a method includes generating a generalized Hankel matrix R representing a covariance matrix to which a spatial averaging is applied by using a correlation vector of baseband-signal vectors acquired from signals received from a plurality of sensor devices, generating a kernel matrix $\Omega_1$, which is a projection matrix onto noise subspace, by performing linear computation using submatrices $R_1$ and $R_2$ of the generalized Hankel matrix R and generating a kernel matrix $\Omega_1$, which is orthogonal with the kernel matrix $\Omega_1$ and estimating a direction of arrival of a signal on the basis of an angular spectrum defined using one of the kernel matrices $\Omega_1$ and $\Omega_2$ as a numerator and the other as a denominator or an algebraic equation using the kernel matrices $\Omega_1$ and $\Omega_2$.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
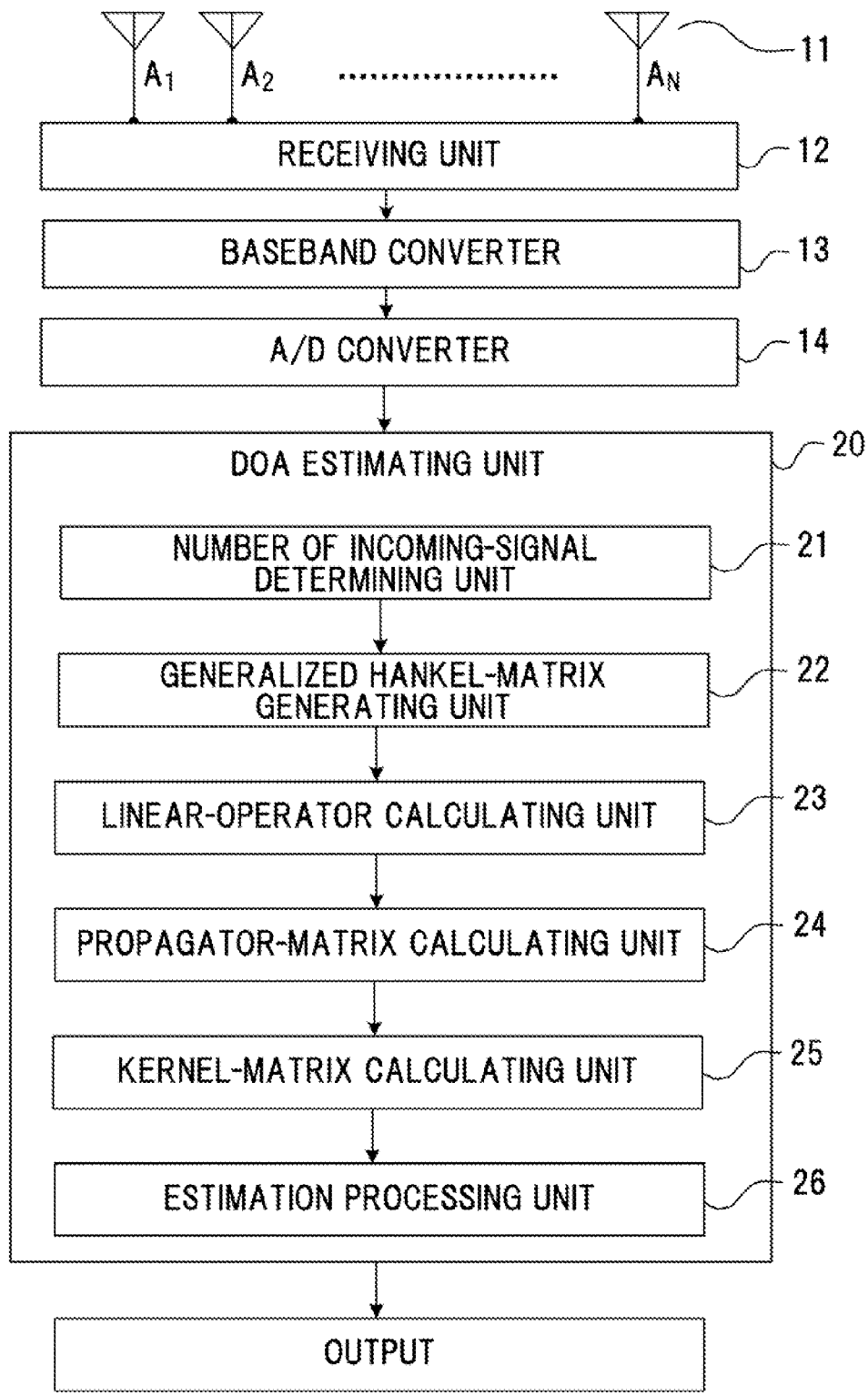
FIG. 1 is a block diagram illustrating the configuration of a DOA estimating apparatus according to a first embodiment.

To solve the above-described problems with estimation precision, an apparatus that performs DOA estimation using a sensor array, e.g., in-vehicle radar system, generates a frequency modulated continuous wave (FMCW) signal by performing frequency modulation on a 76-GHz millimeter-wave carrier signal with a triangular wave signal having a frequency of several hundred Hz and emits the generated signal from a transmission antenna as a target-detecting probe signal. The probe signal reflected at a target (hereinafter, this signal is referred to as "echo signal") contains target information (distance/velocity in line of sight and angle) relative to the radar system. Therefore, the echo signal is received at an array antenna including a plurality of reception antennas and is demodulated appropriately for conversion to a baseband signal and then to a digital signal. The digital signal goes through various types of signal processing for estimating desired target information. However, to estimate the angles of many targets with high precision, the use of an antenna array having many reception antennas is required.

With the in-vehicle radar system described above, the size of the device is to be reduced so that it does not disturb the design of the vehicle. As a technique for reducing the size, multiple transmission antennas and multiple reception antennas are combined to increase the number of effective reception antennas.

However, since the reference signal used for performing RF demodulation on the echo signal is part of the probe signal, the time required for retrieving a set of digital signals (data) on which signal processing is to be carried out from a baseband signal is at least "1/several hundred Hz", which is approximately equal to several tens of milliseconds. Naturally, when the technique for increasing the number of effective reception antennas by combining multiple transmission and reception antennas is used, the time required for data acquisition increases even more. In other words, the total number of data items that can be acquired in a limited amount of time will be extremely small, causing a serious problem in an in-vehicle radar system, which requires real-time processing. That is, even when noise is suppressed by time averaging and correlation is suppressed by spatial averaging, the signal-to-noise ratio (SNR) of data cannot be sufficiently improved. As a result, the precision of DOA estimation is sacrificed for the apparatus configuration. Since it is even more difficult to estimate an accurate number of targets using data with a low SNR, there is a problem in using an angle estimation method that requires an accurate number of incoming waves.

To solve the above-described problems, at least one embodiment of the invention provides highly precise DOA estimation techniques for incoming waves with low processing load.

One or more embodiments of the invention provide the following solutions to solve the problems mentioned above.

A direction-of-arrival (DOA) estimating apparatus according to an aspect of the invention includes a first matrix generating unit configured to generate a generalized Hankel matrix R representing a covariance matrix to which a spatial averaging is applied by using a correlation vector of baseband-signal vectors acquired from signals received from a plurality of sensor devices; a second matrix generating unit configured to generate a kernel matrix $\Omega_1$, which is a projection matrix onto noise subspace, by performing linear computation using submatrices $R_1$ and $R_2$ of the generalized Hankel matrix R and to generate a kernel matrix $\Omega_2$, which is orthogonal with the kernel matrix $\Omega_1$; and an estimating unit configured to estimate a direction of arrival of a signal on the basis of an angular spectrum defined using one of the kernel matrices $\Omega_1$ and $\Omega_2$ as a numerator and the other as a denominator or an algebraic equation using the kernel matrices $\Omega_1$ and $\Omega_2$.

Another aspect may provide a method of estimating a direction of arrival that realizes the above-described configuration, a program thereof, or a storage medium or the like that is computer readable and that stores the program.

These aspects may provide a DOA estimation technique with low processing load and high precision.

An example of a DOA estimating apparatus according to an embodiment will be described below. In each embodiment described below, a DOA estimating apparatus that is used in a radar system for estimating the position of a target is described as an example. The DOA estimating apparatus according to an embodiment is not limited to specific systems. The DOA estimating apparatus according to an embodiment may be used in any system that estimates the direction of arrival of a received incoming wave. The configuration according to each embodiment described below is merely an example, and the embodiments are not limited to the configurations in the examples described below.

A DOA estimating apparatus according to a first embodiment will be described below.

Apparatus Configuration

FIG. 1 is a block diagram illustrating the configuration of a DOA estimating apparatus according to the first embodiment. As illustrated in FIG. 1, the DOA estimating apparatus according to the first embodiment includes a sensor array 11, a receiving unit 12, a baseband converter 13, an analog-to-digital (A/D) converter 14, and a DOA estimating unit 20. Each processing block may be realized by a hardware component, by a software component, or a combination of hardware and software components.

A first matrix generating unit, a second matrix generating unit, and an estimating unit are realized by, for example, a DSP or an FPGA in the DOA estimating apparatus.

The sensor array 11 includes N sensor devices $A_1$ to $A_N$ disposed at different spatial positions. For example, the sensor array 11 may form a uniform linear array (ULA) antenna in which the sensor devices are arranged linearly with equal intervals. Each sensor device may receive an incoming signal (incoming wave). In a case in which the DOA estimating apparatus according to the first embodiment is installed in a radar system, the incoming signal is an echo signal, which is a transmission signal emitted from the radar system and reflected at the target. Each received incoming signal is sent to the receiving unit 12. The number of sensor devices N indicates the number of sensor devices that operate as reception antennas and is equivalent to the number of effective reception antennas when a technique for increasing the number of reception antennas by combining multiple transmission antennas and multiple reception antennas (hereinafter, referred to as "aperture increasing technology") is employed. Hereinafter, the number of sensor devices N is referred to as "number of reception antennas N".

The receiving unit 12 performs low-noise amplification on each signal received at each sensor device. The receiving unit 12 sends the processed received signals to the baseband converter 13. The baseband converter 13 mixes each received signal with part of a transmission wave to generate a baseband signal. When the DOA estimating apparatus according to the first embodiment is installed in a radar system, the transmission wave is used as a probe signal for target detection.

The A/D converter 14 converts each baseband signal to a digital signal by performing sampling in a given sampling cycle. The digital signal generated in this way is sent to the DOA estimating unit 20. Hereinafter, digital signals sent to the DOA estimating unit 20 are referred to as "combined echo signals" or "combined echoes". Here, the term "combined" indicates that each digital signal from each sensor is superposed with echo signals from multiple targets.

Figure 2:
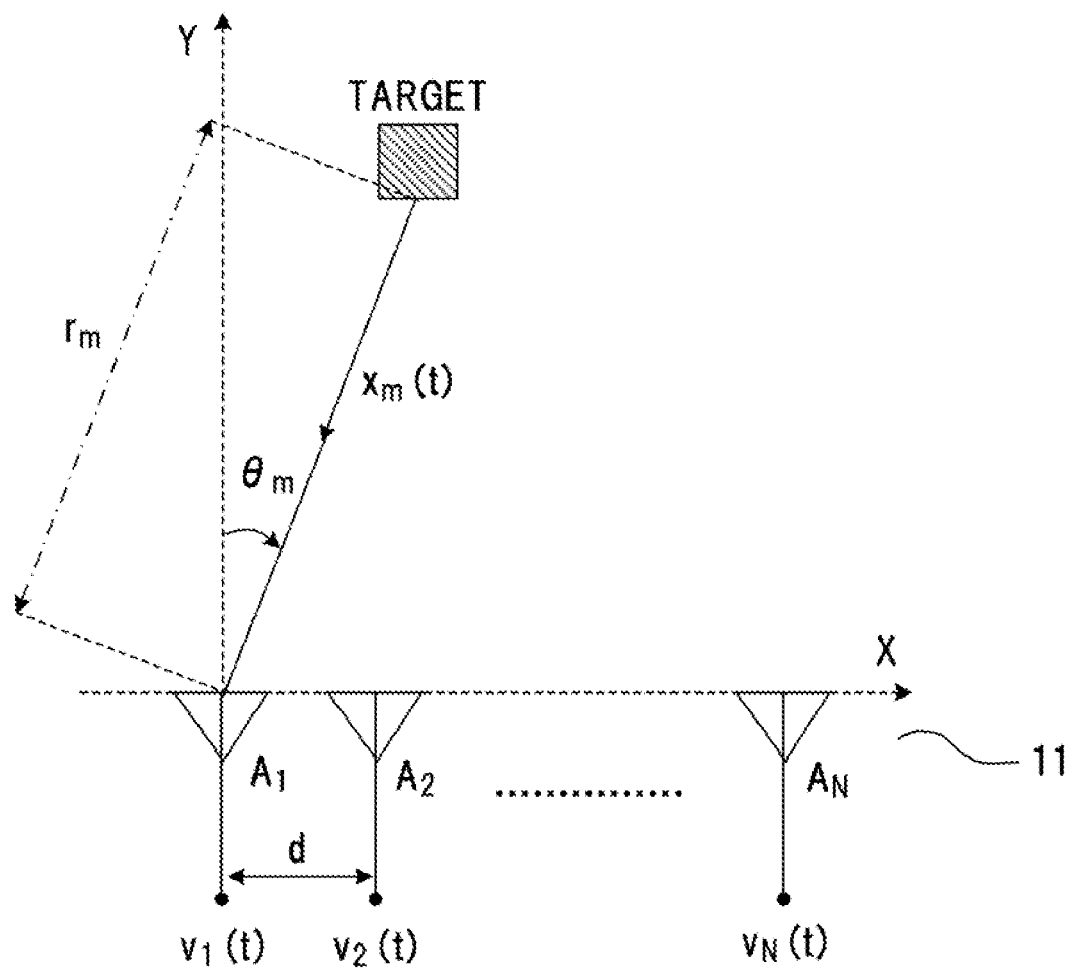
FIG. 2 is schematic view illustrating a combined echo signal.

FIG. 2 is a schematic view illustrating a combined echo signal. FIG. 2 illustrates an example in which the sensor array 11 forms a ULA antenna with N reception antennas disposed at equal intervals d. FIG. 2 illustrates an example in which M ($\leq$N−1) independent signals are incident at different angles $\theta_m$ (m=1, 2, . . . , M). Here, $\theta_m$ represents a measured angle, where the Y axis in FIG. 2 is zero degrees, and the angle increase in the clockwise direction.

A combined echo signal ($v_n(t)$), which is acquired from a signal received at the n-th reception sensor device at time t, is defined by Expression 1.1. In the expression, $x_m(t)$ represents a baseband component of an incoming signal from the m-th target (m-th wave) and, hereinafter, is referred to as "target echo signal" or "target echo". Moreover, $\phi_{n,m}$ represents spatial phase information (reception phase of the m-th wave at the reception antenna device n), j is the imaginary unit, that is, j=sqrt(−1), and $n_n(t)$ represents an additive Gaussian noise component of mean power $\sigma$. Furthermore, $\lambda$, represents the wavelength of a carrier signal (carrier wave).

$$v_n(t) = \sum_{m=1}^{M} x_m(t)\exp(j\phi_{n,m}) + n_n(t) \quad (1.1)$$

$$\phi_{n,m} \equiv \frac{2\pi}{\lambda}(n-1)d\sin\theta_m \quad (1.2)$$

Accordingly, a combined echo signal obtained from a signal received at any one of the N reception sensor devices can be represented as a vector v(t) as defined below in Expression 1.3. Hereinafter, such a vector is referred to as "combined-echo-signal vector." In Expressions 1.3 to 1.6, n(t) represents a noise vector, $a(\theta_m)$ represents a mode vector (directional vector), and the superscript T represents transposition of a vector or a matrix.

$$v(t) = \begin{bmatrix} \sum_{m=1}^{M} x_m(t)\exp(j\phi_{1,m}) + n_1(t) \\ \vdots \\ \sum_{m=1}^{M} x_m(t)\exp(j\phi_{N,m}) + n_N(t) \end{bmatrix} = Ax(t) + n(t) \quad (1.3)$$

$$A \equiv [a(\theta_1), \ldots, a(\theta_M)] = \begin{bmatrix} \exp(j\phi_{1,1}) & \ldots & \exp(j\phi_{1,M}) \\ \vdots & & \vdots \\ \exp(j\phi_{N,1}) & \ldots & \exp(j\phi_{N,M}) \end{bmatrix} \quad (1.4)$$

$$x(t) \equiv [x_1(t) \ldots x_M(t)]^T \quad (1.5)$$

$$n(t) \equiv [n_1(t) \ldots n_N(t)]^T \quad (1.6)$$

Upon reception of a combined echo signal, the DOA estimating unit 20 performs signal processing at the processing blocks described below to estimate the direction of arrival (angle of arrival) of each target echo signal. As illustrated in FIG. 1, the DOA estimating unit 20 includes a number of incoming-signal determining unit 21, a generalized Hankel-matrix generating unit 22, a linear-operator calculating unit 23, a propagator-matrix calculating unit 24, a kernel-matrix calculating unit 25, and an estimation processing unit 26. These processing blocks may be realized by hardware components, by software components, or combinations of hardware and software components. Each processing block in the DOA estimating unit 20 will be described in detail below.

The number of incoming-signal determining unit 21 determines the number of targets, i.e., the number of incoming signals M. The number of incoming-signal determining unit 21 estimates the number of incoming signals M using a known number of target estimating method employing the combined echo signals. Examples of known number of target estimating methods may include AIC (Akaike's Information Criterion), MDL (Minimum Description Length), etc. Since a known number of target estimating method is used, this method will not be described here. The number of incoming signals M determined by the number of incoming-signal determining unit 21 is sent to the generalized Hankel-matrix generating unit 22.

The generalized Hankel-matrix generating unit 22 uses combined-echo-signal vectors representing the received combined echo signals to generate a generalized Hankel matrix R as described below.

The generalized Hankel-matrix generating unit 22 calculates a correlation vector $r_{vL}$ representing the correlation between a combined-echo-signal vector $v(t)$ and a complex conjugate $v_L^*(t)$; the L-th component of the combined-echo-signal vector $v(t)$, and generates a vector $w_L$ which is determined by removing autocorrelation components from the correlation vector $r_{vL}$. The autocorrelation components are removed so as to suppress noise components. The correlation vectors $r_{vL}$ and $w_L$ are defined by Expressions 2.1, 2.2 and 2.3, respectively. Here, L is a natural number greater than or equal to one and smaller than or equal to N, and E[•] represents averaging operation. Hereinafter, it is assumed that the elements of the correlation vectors $r_{vL}$ and $w_L$ are arranged in such a manner that they correspond with the arrangement order of the reception sensors for each identical complex conjugate component.

$$r_{vL} = E[v(t)v_L^*(t)] = E[v_1(t)v_L^*(t), \ldots, v_{N-1}(t)v_L^*(t), v_N(t)v_L^*(t)]^T \quad (2.1)$$

When $N \geq L \geq N-M+1$, $$w_L = E[v_L(t)v_L^*(t), \ldots, v_{L-1}(t)v_L^*(t)]^T \quad (2.2)$$

When $1 \leq L \leq M$, $$w_L = E[v_{L+1}(t)v_L^*(t), \ldots, v_N(t)v_L^*(t)]^T \quad (2.3)$$

The generalized Hankel-matrix generating unit 22 extracts a subvector $w_L(k)$ from the correlation vector $w_L$ from which autocorrelation components are removed. The generalized Hankel-matrix generating unit 22 extracts each subvector $w_L(k)$ such that each vector becomes the (N−M)-dimensional one (hereinafter, (N−M) is referred to as "required dimension"), which is a number determined by subtracting the number of incoming signals M from the number of reception antennas N. The generalized Hankel-matrix generating unit 22 extracts subvectors from first subvectors and second subvectors in the correlation vector $w_L$ described above, where elements of each first subvector is multiple components among components having identical complex conjugate components arranged continuously up to the autocorrelation component by a number greater than or equal to the required dimension, and where elements of each second subvector is multiple components among components having identical complex conjugate components arranged continuously after the autocorrelation component by a number greater than or equal to the required dimension.

To extract the first subvectors (when $N \geq L \geq N-M+1$), combinations of components in the required dimension and arranged continuously without including the autocorrelation component are extracted as subvectors from the first subvectors having identical complex conjugate components. A subvector $w_L(k)$ extracted in this way is defined by the following expression.

When $N \geq L \geq N-M+1$ $$w_L(k) = E\begin{pmatrix} v_k(t)v_L^*(t) \\ \vdots \\ v_{N-M+k-1}(t)v_L^*(t) \end{pmatrix}; k = 1, \ldots, L-(N-M) \quad (2.4)$$

To extract the second subvectors (when $1 \leq L \leq M$), combinations of components in the required dimension and arranged continuously without including the autocorrelation component are extracted as subvectors from the second subvectors having identical complex conjugate components. A subvector $w_L(k)$ extracted in this way is defined by the following expression.

When $1 \leq L \leq M$ $$w_L(k) = E\begin{pmatrix} v_{L+k}(t)v_L^*(t) \\ \vdots \\ v_{N-M+L+k-1}(t)v_L^*(t) \end{pmatrix}; k = 1, \ldots, M-L+1 \quad (2.5)$$

The generalized Hankel-matrix generating unit 22 generates a first matrix $R_{f1}^L$ defined by Expression 2.6 and a second matrix $R_{f2}^L$ defined by Expression 2.7 by arranging the subvectors $w_L(k)$. When L=N in Expression 2.6 and when L=1 in Expression 2.7, a zero matrix is not added. A zero matrix is added for dimension adjustment so that components at identical element positions in different matrices have the same phase relationship.

When $N \geq L \geq N-M+1$, $$R_{f1}^L = [0_{(N-M)\times(N-L)}, w_L(1), \ldots, w_L(M+L-N)] \quad (2.6)$$

When $1 \leq L \leq M$, $$R_{f2}^L = [w_L(1), \ldots, w_L(M-L+1), 0_{(N-M)\times(L-1)}] \quad (2.7)$$

The generalized Hankel-matrix generating unit 22 generates a forward spatial smoothing (FSS)-generalized Hankel matrix $R_{f1}$ as defined by Expression 2.8 by adding together the first matrices $R_{f1}{}^l$. Through such an addition, components (elements) having the same phase relationship are added together. Similarly, the generalized Hankel-matrix generating unit 22 generates an FSS-generalized Hankel matrix $R_{f2}$ as defined by Expression 2.9 by adding together the second matrices $R_{f2}{}^l$.

$$R_{f1} = \sum_{l=N}^{N-M+1} R_{f1}^l \tag{2.8}$$

$$R_{f2} = \sum_{l=1}^{M} R_{f2}^l \tag{2.9}$$

Since, in the FSS-generalized Hankel matrices $R_{f1}$ and $R_{f2}$, dimension adjustment of the first matrix $R_{f1}{}^L$ and the second matrix $R_{f2}{}^L$ is performed by adding zero matrices, the magnitudes of the column vectors differ. Thus, to match the magnitudes of the column vectors, the generalized Hankel-matrix generating unit 22 calculates, as shown below, Hadamard products of coefficient matrices $G^{M1}$ and $G^{M2}$ having ((N−M)×M) dimension and the FSS-generalized Hankel matrices $R_{f1}$ and $R_{f2}$. A Hadamard product is the entry-wise product of matrices and is represented by (Hadamard). To reduce the amount of calculation, the FSS-generalized Hankel matrices $R_{f1}$ and $R_{f2}$ calculated in Expressions 2.8 and 2.9 may be used directly without using Expressions 2.11 and 2.13. However, the precision of angle estimation is improved when a Hadamard product, which averages the magnitude of the vectors, is used.

$$G^{M1} = \begin{bmatrix} 1 & 1/2 & \ldots & 1/M \\ 1 & 1/2 & & 1/M \\ \vdots & \vdots & & \vdots \\ 1 & 1/2 & \ldots & 1/M \end{bmatrix} \tag{2.10}$$

$$R_{f1} = G^{M1}(Hadamard)R_{f1} \tag{2.11}$$

$$G^{M2} = \begin{bmatrix} 1/M & 1/(M-1) & \ldots & 1 \\ 1/M & 1/(M-1) & & 1 \\ \vdots & \vdots & & \vdots \\ 1/M & 1/(M-1) & \ldots & 1 \end{bmatrix} \tag{2.12}$$

$$R_{f2} = G^{M2}(Hadamard)R_{f2} \tag{2.13}$$

Furthermore, to improve the precision and prevent the angle estimation calculation from failing even when some of the reception sensors fail, instead of Expressions 2.8 and 2.9, scalar values defined by Expressions 2.8a and 2.9a may be introduced to generate Expressions 2.8b and 2.9b. Then, from these expressions, Expressions 2.10 to 2.13 may be generated.

When $N \geq L \geq N-M+1$, $$h_1^L = \frac{|v_N|}{|v_L^t|} \tag{2.8a}$$

When $1 \leq L \leq M$, $$h_2^L = \frac{|v_1|}{|v_L^t|} \tag{2.9a}$$

$$R_{f1} = \sum_{l=N}^{N-M+1} h_1^l R_{f1}^l \tag{2.8b}$$

$$R_{f2} = \sum_{l=1}^{M} h_2^l R_{f2}^l \tag{2.9b}$$

The scalar numerators in Expressions 2.8a and 2.9a may be replaced with, for example, signals corresponding to the smallest L and the largest L, except for those of the sensors within the range of L but cannot be used due to failure, etc.

The generalized Hankel-matrix generating unit 22 uses the FSS-generalized Hankel matrices $R_{f1}$ and $R_{f2}$, which are generated as described above, to generate the following backward spatial smoothing (BSS)-generalized Hankel matrices $R_{b1}$ and $R_{b2}$. In Expressions 2.14 and 2.15, the matrices $R_{f1}{}^*$ and $R_{f2}{}^*$ are matrices which elements are complex conjugates of the elements of the FSS-generalized Hankel matrices $R_{f1}$ and $R_{f2}$, where a matrix $J_{N-M}$ is a (N−M)-dimensional anti-diagonal unit matrix, and a matrix $J_M$ is a M-dimensional anti-diagonal unit matrix.

$$R_{b1} = J_{N-M} R_{f2}^* J_M \tag{2.14}$$

$$R_{b2} = J_{N-M} R_{f1}^* J_M \tag{2.15}$$

The generalized Hankel-matrix generating unit 22 uses the FSS-generalized Hankel matrices $R_{f1}$ and $R_{f2}$ and the BSS-generalized Hankel matrices $R_{b1}$ and $R_{b2}$, which are generated as described above, to generate the following generalized Hankel matrix R. The generalized Hankel-matrix generating unit 22 sends the generated generalized Hankel matrix R to the linear-operator calculating unit 23.

$$R = [R_{f1} R_{f2} R_{b1} R_{b2}] \tag{2.16}$$

A first technique to achieve highly precise estimation is for the generalized Hankel-matrix generating unit 22 to generate the generalized Hankel matrix R as represented in Expression 2.16. A second technique, which can achieve acceptably precise estimation albeit relatively less precise estimation, is to generate the generalized Hankel matrix R from at least one of the spatial averaging matrices $R_{f1}$, $R_{f2}$, $R_{b1}$, and $R_{b2}$. For example, even when compensation by Expressions 2.8b and 2.9b is performed because signals are not received at some of the sensor devices due to failure, only spatial averaging matrices generated without failure may be used when any one of the spatial averaging matrices $R_{f1}$, $R_{f2}$, $R_{b1}$, and $R_{b2}$, which contain all necessary angular information, cannot be generated. In this way, even when a device, such as a sensor device, fails, the possibility of failure of all elements in a matrix R including the phase required for estimating the direction of arrival becomes low, and thus, the possibility of failure in the DOA estimation becomes low. The generalized Hankel-matrix generating unit 22 sends the generalized Hankel matrix R and the number K of spatial averaging matrices $R_{f1}$, $R_{f2}$, $R_{b1}$, and $R_{b2}$ contained in the generalized Hankel matrix R to the linear-operator calculating unit 23.

The linear-operator calculating unit 23 divides the generalized Hankel matrix R sent from the generalized Hankel-matrix generating unit 22 into a submatrix $R_1$ and a submatrix $R_2$, as described in Expression 3.1 below, on the basis of the number K of spatial averaging matrices used for generating the matrix R. The dimensions of the generalized Hankel matrix R, the submatrix $R_1$, and the submatrix $R_2$ is ((N−M)× KM), (M×KM), and ((N−2M)×KM), respectively. The linear-operator calculating unit 23 uses the submatrices $R_1$ and $R_2$ to generate a linear operator Γ. The linear-operator calculating unit 23 sends the generated linear operator Γ to the propagator-matrix calculating unit 24. The superscript −1 in Expression 3.2, etc., represents an inverse matrix, and the character H represents complex conjugate transposition.

$$R = \begin{bmatrix} R_1 \\ R_2 \end{bmatrix} \qquad (3.1)$$

$$\Gamma = (R_1 R_1^H)^{-1} R_1 R_2^H \qquad (3.2)$$

The propagator-matrix calculating unit 24 uses the linear operator Γ and a (N−2M)-dimensional unit matrix $I_{N-2N}$ to generate a propagator matrix Π as defined in Expression 3.3. The propagator-matrix calculating unit 24 sends the propagator matrix Π to the kernel-matrix calculating unit 25. Instead of the propagator matrix Π, the propagator-matrix calculating unit 24 may send an orthogonal propagator matrix Π' calculated from the propagator matrix Π as shown in Expression 3.4 to the kernel-matrix calculating unit 25.

$$\prod = \begin{bmatrix} \Gamma \\ -I_{N-2M} \end{bmatrix} \qquad (3.3)$$

$$\prod{}' = \prod (\prod{}^H \prod)^{-1/2} \qquad (3.4)$$

The kernel-matrix calculating unit 25 generates a kernel matrix $\Omega_1$, as shown below, using the propagator matrix Π or the orthogonal propagator matrix Π' (Expression 3.5 or 3.6). The generated kernel matrix $\Omega_1$ is a projection matrix onto a noise subspace. The dimension of the kernel matrix $\Omega_1$ is (N−M)×(N−M).

$$\Omega_1 = \Pi(\Pi^H \Pi)^{-1} \Pi^H \qquad (3.5)$$

$$\Omega_1 = \Pi' \Pi'^H (= \Pi(\Pi^H \Pi)^{-1} \Pi^H) \qquad (3.6)$$

The kernel-matrix calculating unit 25 uses the kernel matrix $\Omega_1$ calculated by Expression 3.5 or 3.6 to calculate a kernel matrix $\Omega_1$, which is orthogonal with the kernel matrix $\Omega_1$. Accordingly, since the kernel matrix $\Omega_1$ is orthogonal with the kernel matrix $\Omega_1$, which is a projection matrix onto noise subspace, the kernel matrix $\Omega_2$ is a projection matrix onto signal subspace. The kernel-matrix calculating unit 25 calculates the kernel matrix $\Omega_2$ by subtracting the kernel matrix $\Omega_1$, which is calculated as described above, from a (N−M)-dimensional unit matrix $I_{N-M}$. The dimension of the kernel matrix $\Omega_2$ is also (N−M)×(N−M).

$$\Omega_2 = I_{N-M} - \Omega_1 \qquad (3.7)$$

The fact that the kernel matrix $\Omega_2$, which is calculated in Expression 3.7, is orthogonal to the kernel matrix $\Omega_1$ can be proved as follows. When the kernel matrix $\Omega_1$ and the kernel matrix $\Omega_2$ are orthogonal to each other, the relationship represented by Expression 3.10 holds. By substituting Expression 3.7 into the kernel matrix $\Omega_2$ in the second term of Expression 3.10, the orthogonal relationship between the kernel matrix $\Omega_2$ and the kernel matrix $\Omega_1$ can be confirmed through Expression 3.11 based on the relationship between Expressions 3.8 and 3.9.

$$\Omega_1^H = [\Pi(\Pi^H \Pi)^{-1} \Pi^H]^H = \Pi(\Pi^H \Pi)^{-1} \Pi^H = \Omega_1 \qquad (3.8)$$

$$\Omega_1^H \Omega_1 = \Omega_1 \Omega_1 = \Pi(\Pi^H \Pi)^{-1} \Pi^H \Pi(\Pi^H \Pi)^{-1} \Pi^H = \Pi(\Pi^H \Pi)^{-1} \Pi^H = \Omega_1 \qquad (3.9)$$

$$\Omega_1 \Omega_2^H = \Omega_1^H \Omega_2 = 0 \qquad (3.10)$$

$$\Omega_1^H \Omega_2 = \Omega_1 (I_{N-M} - \Omega_1) = \Omega_1 - \Omega_1 \Omega_1 = \Omega_1 - \Omega_1 = 0 \qquad (3.11)$$

The kernel-matrix calculating unit 25 sends the calculated kernel matrices $\Omega_1$ and $\Omega_2$ to the estimation processing unit 26.

The estimation processing unit 26 may calculate an angular spectrum in which at least one of the kernel matrices $\Omega_1$ and $\Omega_2$ is substituted into the numerator and the other into the denominator. Alternatively, the kernel matrices $\Omega_1$ and $\Omega_2$ may be combined through linear combination, etc., in both the numerator and the denominator. Expression 3.12 shows an example in which an angular spectrum is calculated by substituting the kernel matrix $\Omega_1$, which is a projection matrix onto noise subspace, into the denominator and substituting the kernel matrix $\Omega_2$, which is a projection matrix on signal subspace, into the numerator. The estimation processing unit 26 scans the parameter θ of a mode vector in this angular spectrum and estimates the angle of arrival of an incoming wave by determining the value of θ when P(θ) peaks. In such a case, the mode vector a(θ) using the parameter θ is defined in Expression 3.13, where α=d/λ.

$$P(\theta) = \frac{a^H(\theta) \Omega_2 a(\theta)}{a^H(\theta) \Omega_1 a(\theta)} \qquad (3.12)$$

$$a(\theta) = [1, \; \exp(j2\pi\alpha\sin\theta), \; \ldots, \; \exp(j2\pi\alpha(N-M-1)\sin\theta)]^T \qquad (3.13)$$

Instead of using the angular spectrum as described above, the estimation processing unit 26 may estimate the angle of arrival of an incoming wave using an algebraic equation. In such a case, the estimation processing unit 26 acquires candidates $Z_m$ of a solution that satisfies Expression 3.14, and finally determines $Z_m$ as the valid solution when the value of Expression 3.15 becomes large enough by substituting the Zm into Z in the Expression. The estimation processing unit 26 estimates the angle of arrival $\theta_m$ of an incoming wave by substituting the determined $Z_m$ into Expression 3.16.

$$a(1/z)^T \Omega_1 a(z) = 0 \qquad (3.14)$$

$$a(1/z)^T \Omega_2 a(z) \qquad (3.15)$$

$$\theta_m = \arcsin[(1/(2\pi\alpha))\arg(z_m)] \qquad (3.16)$$

Instead, the angle of arrival $\theta_m$ of an incoming wave may be estimated by Expression 3.16 using the value z that provides a maximum value by solving the extreme value problem for z in the rational function defined by Expression 3.14a.

$$f(z) = \frac{a^T(1/z) \Omega_2 a(z)}{a^T(1/z) \Omega_1 a(z)} \qquad (3.14a)$$

As a solution for such a case, a non-linear optimization approach, such as the Newton method, is used.

Operation and Advantage of First Embodiment

With the DOA estimating apparatus according to the first embodiment, baseband signals are generated from the signals received at N sensor devices in the sensor array 11, and, then, digital signals are generated (receiving unit 12, baseband converter 13, and A/D converter 14). Subsequently, the generalized Hankel-matrix generating unit 22 of the DOA estimating unit 20 generates a generalized Hankel matrix R from a correlation vector of combined-echo-signal vectors v(t)

containing the digital signals as elements (generalized Hankel-matrix generating unit 22).

The linear-operator calculating unit 23 and the propagator-matrix calculating unit 24 perform linear computation using submatrices $R_1$ and $R_2$ of the generated generalized Hankel matrix R to generate a linear operator $\Gamma$ and a propagator matrix $\Pi$ or an orthogonal propagator matrix $\Pi'$. By using the generated matrices, the kernel-matrix calculating unit 25 generates a kernel matrix $\Omega_1$, which is a projection matrix onto noise subspace, and a kernel matrix $\Omega_2$, which is orthogonal with the kernel matrix $\Omega_1$. As a result, the estimation processing unit 26 estimates the direction of arrival of a signal on the basis of an angular spectrum defined by the kernel matrices $\Omega_1$ and $\Omega_2$ or an algebraic equation.

In particular, when estimation is carried out on the basis of an angular spectrum, the kernel matrix $\Omega_1$, which is a projection matrix onto noise subspace, is substituted into the denominator, and the kernel matrix $\Omega_2$, which is orthogonal to the kernel matrix $\Omega_2$ and is a projection matrix onto signal subspace, is substituted into the numerator. In general, one of the kernel matrices is substituted into the denominator, and the other is substituted into the numerator. In this way, with the angular spectrum $P(\theta)$ used in the first embodiment, when the angular spectrum $a^H(\theta)\Omega_1 a(\theta)$ in noise subspace is a minimum value, at the same time, the angular spectrum $a^H(\theta)\Omega_2 a(\theta)$ in signal subspace is a maximum value with respect to the mode vector $a(\theta)$; therefore, the peak of the estimated target angle is emphasized, and the spurious peaks due to noise are reduced.

Thus, with the DOA estimating apparatus according to the first embodiment, highly precise estimation of the direction of arrival is achieved.

In the first embodiment, the FSS-generalized Hankel matrices $R_{f1}$ and $R_{f2}$, which are elements of the generalized Hankel matrix R used for generating the kernel matrices $\Omega_1$ and $\Omega_2$ described above, are generated as follows.

The generalized Hankel-matrix generating unit 22 obtains a correlation vector $r_{VL}$ of the combined-echo-signal vectors $v(t)$ and complex conjugates $v_L^*(t)$ of the components of the combined-echo-signal vectors $v(t)$ and multiple subvectors $(w_L(k))$ having (N−M) dimension are extracted from the correlation vector $r_{VL}$.

From each of the multiple components aligned to correspond with the arrangement order of the reception sensors for each identical complex conjugate component of the correlation vector $r_{VL}$, each subvector is extracted to have an element that is a combination of continuously aligned (N−M) components of identical complex conjugate components without including an autocorrelation component.

The subvectors extracted in this way having identical complex conjugate components are aligned to generate a first matrix $R_{f1}^L$ and a second matrix $R_{f2}^L$ having the same dimension ((N−M)×M) so that components with matching phase relationships are arranged in the same element positions.

The first matrix $R_{f1}^L$ is generated from a subvector whose elements are combinations extracted from multiple components among components having identical complex conjugate components arranged continuously up to an autocorrelation component. The first matrix $R_{f2}^L$ is generated from a subvector whose elements are combinations extracted from multiple components among components having identical complex conjugate components arranged continuously after the autocorrelation component. The first matrix $R_{f1}^L$ and the second matrix $R_{f2}^L$ are respectively added to calculate the FSS-generalized Hankel matrices $R_{f1}$ and $R_{f2}$.

In this way, according to the first embodiment, a spatial averaging matrix is generated from elements of a correlation vector having multiple complex conjugate components. Thus, according to the first embodiment, highly precise angle estimation is possible even when the angle is estimated by performing measurement few times using a probe signal modulated by a low-frequency signal.

Second Embodiment

Figure 3:
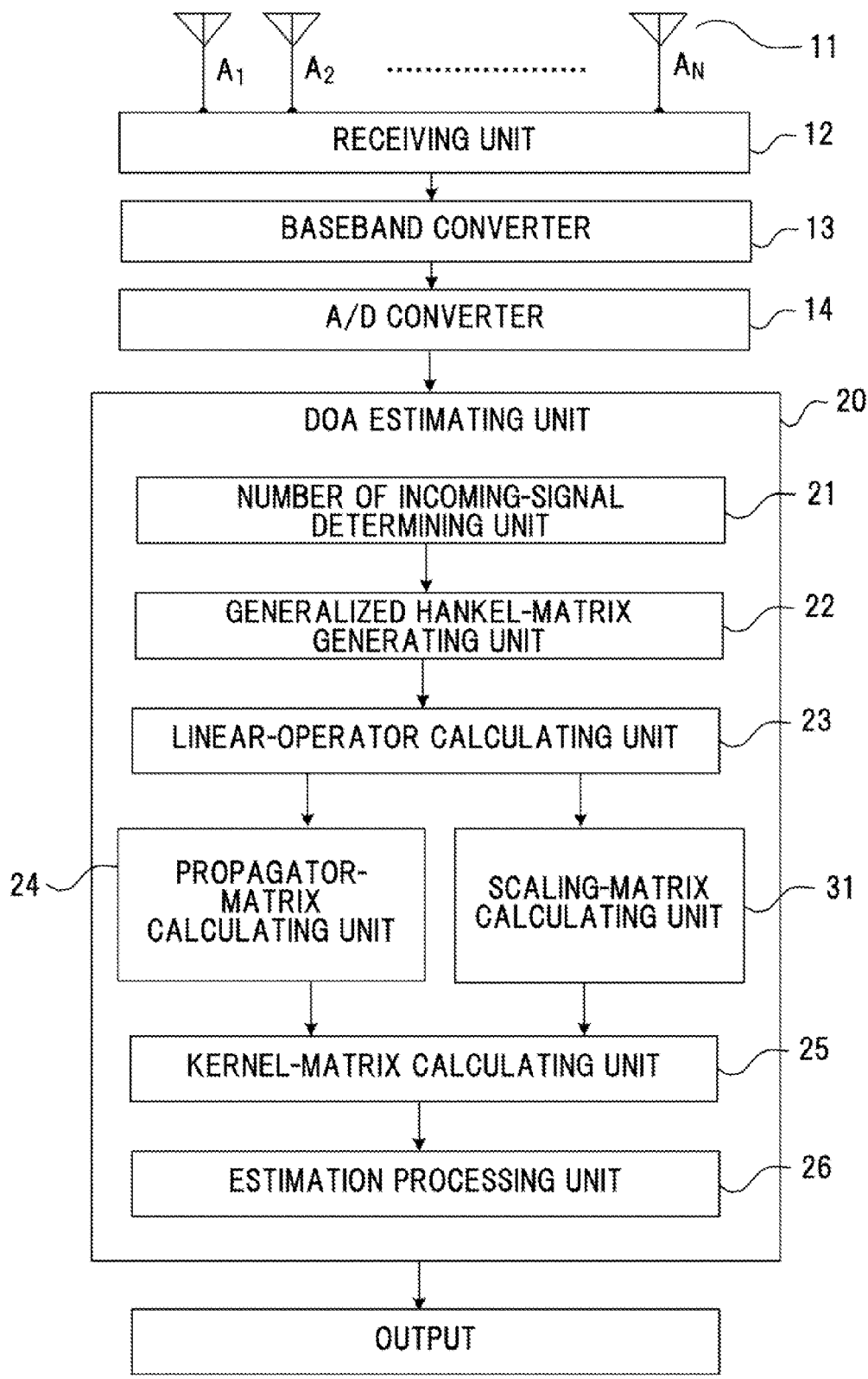
FIG. 3 is a block diagram illustrating the configuration of a DOA estimating apparatus according to a second embodiment.

FIG. 3 is a block diagram illustrating the configuration of a DOA estimating apparatus according to a second embodiment. As illustrated in FIG. 3, the DOA estimating apparatus according to the second embodiment has the same configuration as that of the first embodiment and, in addition, includes a scaling-matrix calculating unit 31. Structures of the DOA estimating apparatus according to the second embodiment that differ from those of the first embodiment will be described below.

The number of incoming-signal determining unit 21 according to the second embodiment sets the number of incoming signals M to the maximum number for which angle estimation can be performed by the sensor array 11. In such a case, the number of incoming signals M is set to, for example, the maximum natural number smaller than or equal to (N−1)/2. The number of incoming-signal determining unit 21 may save in a memory in advance, the number of incoming signals M, which is determined as described above, as a fixed value. In this way, according to the second embodiment, calculation load can be reduced because processing for estimating the number of incoming signals is not carried out as in the first embodiment.

In this way, according to the second embodiment, highly precise angle estimation is possible without using an accurate number of incoming signals M. This is because a scaling matrix, which is described below, is used for calculating a kernel matrix. Similar to the first embodiment, in the second embodiment, an accurate number of incoming signals M may be determined through processing for estimating the number of incoming signals.

The scaling-matrix calculating unit 31 receives a linear operator $\Gamma$ and submatrices $R_1$ and $R_2$ from the linear-operator calculating unit 23 and, using these, generates a scaling matrix $\Lambda$ represented by Expression (4.1). The scaling-matrix calculating unit 31 sends the calculated scaling matrix $\Lambda$ to the kernel-matrix calculating unit 25.

$$\Lambda = R_2 R_2^H - R_2 R_1^H \Gamma \tag{4.1}$$

The kernel-matrix calculating unit 25 receives the scaling matrix $\Lambda$ (Expression 4.1) from the scaling-matrix calculating unit 31 and receives the propagator matrix $\Pi$ (Expression 3.3) or the orthogonal propagator matrix $\Pi'$ (Expression 3.4) from the propagator-matrix calculating unit 24. The kernel-matrix calculating unit 25 calculates the kernel matrix $\Omega_1$ as described below from the scaling matrix $\Lambda$ and the propagator matrix $\Pi$ or the orthogonal propagator matrix $\Pi'$ (Expression 4.2 or 4.3).

$$\Omega_1 = \Pi \Lambda^{-1} \Pi^H = (RR^H)^{-1} - \begin{pmatrix} (R_1 R_1^H)^{-1} & 0 \\ 0 & 0 \end{pmatrix} \tag{4.2}$$

$$\Omega_1 = \Pi' \Lambda^{-1} \Pi'^H \tag{4.3}$$

The kernel-matrix calculating unit 25 uses the kernel matrix $\Omega_1$ calculated in Expression 4.2 or 4.3 to calculate the kernel matrix $\Omega_2$ orthogonal to the kernel matrix $\Omega_1$. As examples of a calculation method of the kernel matrix $\Omega_1$, one of the two methods described below may be employed in the second embodiment.

First Calculation Method

In the first calculation method, the kernel-matrix calculating unit 25 calculates the kernel matrix $\Omega_2$ using, for example, Expression 4.4.

$$\Omega_2 = \begin{bmatrix} \Omega_2^{11} & \Omega_2^{12} \\ \Omega_2^{21} & \Omega_2^{22} \end{bmatrix} = \begin{bmatrix} R_1 R_1^H & 0_{M \times (N-2M)} \\ R_2 R_1^H & 0_{N-2M} \end{bmatrix} \quad (4.4)$$

Derivation of Expression 4.4 will be described below using an example of the kernel matrix $\Omega_1$ represented by Expression 4.2. As described above, when the kernel matrix $\Omega_1$ and the kernel matrix $\Omega_2$ are orthogonal to each other, the relationship represented by Expression 3.10 holds. Furthermore, the kernel matrix $\Omega_1$ has a property represented by Expression 3.8, and the propagator matrix $\Pi$ is represented by Expression 3.3. By calculating the first term in Expression 3.10 on the basis of such relationships, Expression 4.5 below is obtained.

$$\Omega_1^H \Omega_2 = [\Pi \Lambda^{-1} \Pi^H]^H \Omega_2 \quad (4.5)$$
$$= \Pi \Lambda^{-1} \Pi^H \Omega_2$$
$$= \begin{bmatrix} \Gamma \Lambda^{-1} \Gamma^H & -\Gamma \Lambda^{-1} \\ -\Lambda^{-1} \Gamma^H & \Lambda^{-1} \end{bmatrix} \Omega_2$$

When the kernel matrix $\Omega_2$ is divided into submatrices $\Omega_2^{11}$, $\Omega_2^{12}$, $\Omega_2^{21}$, and $\Omega_2^{22}$ in the same manner as the submatrices of the kernel matrix $\Omega_1$, the equation for determining the kernel matrix $\Omega_2$ is determined by Expression 4.6 below. The relationships represented by Expressions 4.7 and 4.8 are obtained from the first and second columns of the equation.

$$\begin{bmatrix} \Gamma \Lambda^{-1} \Gamma^H & -\Gamma \Lambda^{-1} \\ -\Lambda^{-1} \Gamma^H & \Lambda^{-1} \end{bmatrix} \begin{bmatrix} \Omega_2^{11} & \Omega_2^{12} \\ \Omega_2^{21} & \Omega_2^{22} \end{bmatrix} = \quad (4.6)$$
$$\begin{bmatrix} \Gamma \Lambda^{-1} (\Gamma^H \Omega_2^{11} - \Omega_2^{21}) & \Gamma \Lambda^{-1} (\Gamma^H \Omega_2^{12} - \Omega_2^{22}) \\ -\Lambda^{-1} (\Gamma^H \Omega_2^{11} - \Omega_2^{21}) & -\Lambda^{-1} (\Gamma^H \Omega_2^{12} - \Omega_2^{22}) \end{bmatrix} = 0$$

$$\Gamma \Lambda^{-1} (\Gamma^H \Omega_2^{11} - \Omega_2^{21}) = -\Lambda^{-1} (\Gamma^H \Omega_2^{11} - \Omega_2^{21}) = 0 \quad (4.7)$$

$$\Gamma \Lambda^{-1} (\Gamma^H \Omega_2^{12} - \Omega_2^{22}) = -\Lambda^{-1} (\Gamma^H \Omega_2^{12} - \Omega_2^{22}) = 0 \quad (4.8)$$

Submatrices of the kernel matrix $\Omega_2$ satisfying either Expression 4.9 and 4.10 may be determined from the relationships represented by Expressions 4.7 and 4.8. The mathematical symbol placed between the terms in Expressions 4.9 and 4.10 represents orthogonality. When the matrix $\Lambda^{-1}$ is scalar, submatrices of the kernel matrix $\Omega_2$ satisfying either Expression 4.11 or 4.12 may be determined. By substituting the components of Expression 4.4 into Expressions 4.11 and 4.12 on the basis of Expression 3.2, it is apparent that the kernel matrix $\Omega_2$ satisfies Expression 3.10. Various different solutions exist for the kernel matrix $\Omega_2$ that satisfies Expressions 4.11 and 4.12, and these solutions can be easily determined. Typically, however, the least squares method may be used by assuming that the equations are for submatrices $\Omega_2^{11}$, $\Omega_2^{12}$, $\Omega_2^{21}$, and $\Omega_2^{22}$.

$$\Lambda^{-1} \perp \Gamma^H \Omega_2^{11} - \Omega_2^{21} \quad (4.9)$$

$$\Lambda^{-1} \perp \Gamma^H \Omega_2^{12} - \Omega_2^{22} \quad (4.10)$$

$$\Gamma^H \Omega_2^{11} - \Omega_2^{21} = 0 \quad (4.11)$$

$$\Gamma^H \Omega_2^{12} - \Omega_2^{22} = 0 \quad (4.10)$$

When M is a maximum natural number that is smaller than or equal to $(N-1)/2$, the maximum dimension of the matrix $\Lambda^{-1}$ is $2 \times 2$; therefore, even when the dimension of the matrix $\Lambda^{-1}$ is greater than $1 \times 1$, the submatrices of the kernel matrix $\Omega_2$ orthogonal to the left terms of Expressions 4.9 and 4.10 may be obtained by performing eigenvalue decomposition of the scaling matrix $\Lambda^{-1}$.

Second Calculation Method

In the second calculation method, the kernel-matrix calculating unit 25 calculates the kernel matrix $\Omega_2$ using Expression 4.13.

$$\Omega_2 = RR^H \quad (4.13)$$

Derivation of Expression 4.13 will be described below using an example of the kernel matrix $\Omega_1$ represented by Expression 4.2. It is known that Expression 4.14 holds on the basis of a propagator theory at an angular position at which an incoming signal exists. Thus, the product of the generalized Hankel matrix R and the complex conjugate transposition (Hermitian conjugate transposition) $R^H$ of the generalized Hankel matrix R at an angular position at which an incoming signal exists can be expanded as in Expression 4.15 using the relationship in Expression 4.14 and the submatrices $R_1$ and $R_2$ in Expression 3.1.

$$R_2^H = R_1^H \Gamma \quad (4.14)$$

$$RR^H = \begin{bmatrix} R_1 \\ \Gamma^H R_1 \end{bmatrix} [R_1^H \quad R_1^H \Gamma] = \begin{bmatrix} I_M \\ \Gamma^H \end{bmatrix} R_1 R_1^H [I_M \quad \Gamma] \quad (4.15)$$

By defining a matrix containing a M-dimensional unit matrix $I_M$ and the linear operator $\Gamma$, which are included in Expression 4.15, as a matrix $\Sigma$ represented by Expression 4.16, the fact that the matrix $\Sigma$ is orthogonal with the propagator matrix $\Pi$ is indicated by Expression 4.17. That is, the propagator matrix $\Pi$ corresponds to a mapping on noise subspace, whereas the matrix $\Sigma$ corresponds to a mapping on signal subspace. Thus, by Expression 4.13, the kernel matrix $\Omega_2$, orthogonal to the kernel matrix $\Omega_1$ can be calculated.

$$\Sigma = \begin{bmatrix} I_M \\ \Gamma^H \end{bmatrix} \quad (4.16)$$

$$\Pi^H \Sigma = [\Gamma^H \quad -I_{N-2M}] \begin{bmatrix} I_M \\ \Gamma^H \end{bmatrix} = 0 \quad (4.17)$$

In this embodiment, the following cases are also cases in which the matrices $\Omega_1$ and $\Omega_2$ are orthogonal to each other. Specifically, with the second calculation method, the kernel matrix $\Omega_1$ represented by Expression 4.2 is determined as a first kernel matrix, and the kernel matrix $\Omega_2$ represented by Expression 4.13 is determined as a second kernel matrix. Therefore, when Expression 3.10 representing an orthogonal relationship is calculated using the rightmost side of Expression 4.2 and Expression 4.13, the following equation holds.

$$\Omega_1^H \Omega_2 = \left[ (RR^H)^{-1} - \begin{pmatrix} (R_1 R_1^H)^{-1} & 0 \\ 0 & 0 \end{pmatrix} \right] (RR^H) = \begin{pmatrix} 0 & -\Gamma \\ 0 & I_{N-2M} \end{pmatrix} \quad (4.18)$$

In such a case, the main matrices $\Pi$ and $\Sigma$, which determine the relationship with subspaces in the kernel matrices $\Omega_1$ and $\Omega_2$, are orthogonal, but the entire kernel matrices $\Omega_1$ and $\Omega_2$ do not have a complete orthogonal relationship. In such a case also, the kernel matrices $\Omega_1$ and $\Omega_2$ are assumed to have a practically orthogonal relationship.

Operation and Advantage of Second Embodiment

With the DOA estimating apparatus according to the second embodiment, processing for estimating the number of incoming signals is not performed, but the maximum number of incoming signals M which angle can be estimated with the sensor array 11 is determined, and this number of incoming signals M is used for estimating the direction of arrival. Thus, according to the second embodiment, by omitting the processing for estimating the number of incoming signals, calculation load can be reduced.

With the DOA estimation according to the second embodiment, the scaling-matrix calculating unit 31 uses the submatrices $R_1$ and $R_2$ of the generalized Hankel matrix R and the linear operator $\Gamma$ to calculate the scaling matrix $\Lambda$ (Expression 4.1). In the second embodiment, by using the scaling matrix $\Lambda$ in addition to the propagator matrix $\Pi$ or the orthogonal propagator matrix $\Pi'$, the kernel matrix $\Omega_1$ is calculated. As a result, the kernel matrix $\Omega_1$ and the kernel matrix $\Omega_2$, which is orthogonal with the kernel matrix $\Omega_1$, are used to estimate the direction of arrival, in a manner similar to that in the first embodiment.

In this way, according to the second embodiment, the kernel matrix $\Omega_1$, which is a projection matrix onto noise subspace, is calculated using the scaling matrix $\Lambda$, which extremely sensitively responds to the presence of a signal. Therefore, even when the accurate number of incoming signals M is not determined, the direction of arrival can be estimated highly precisely.

First Variation

In the first and second embodiments described above, a spatial averaging matrix (generalized Hankel matrix) is generated from elements of a correlation vector having multiple complex conjugate components. Specifically, the generalized Hankel-matrix generating unit 22 according to the first and second embodiments generates a first matrix $R_{f1}^L$ and a second matrix $R_{f2}^L$ corresponding to the range L of a correlation vector $r_{VL}$ (Expression 2.1), which is represented by a natural number L greater than or equal to one and smaller than or equal to N. In a first variation, the generalized Hankel-matrix generating unit 22 processes a correlation vector $r_{vN}$ of a combined-echo-signal vector v(t) and a complex conjugate $v_N^*(t)$ of the N-th component, and a correlation vector $r_{v1}$ of the combined-echo-signal vector v(t) and a complex conjugate $v_1^*(t)$ of the first component. At this time, the generalized Hankel-matrix generating unit 22 generates correlation vectors $r_{vN}$ and $r_{v1}$ represented by Expressions 5.1a and 5.1b.

$$r_{vN} = E[v(t)v_N^*(t)] \quad (5.1a)$$

$$r_{v1} = E[v(t)v_1^*(t)] \quad (5.1b)$$

The generalized Hankel-matrix generating unit 22 aligns the elements of the correlation vectors as indicated in Expressions 5.2a, 5.2b, 5.3a, and 5.3b to generate matrices $R_{f1}$ and $R_{f2}$. The generalized Hankel-matrix generating unit 22 according to the first variation further determines matrices $R_{b1}$ and $R_{b2}$ for the generated matrices $R_{f1}$ and $R_{f2}$ in a manner similar to that according to Expressions 2.14 and 2.15, aligns them as indicated in Expression 2.16, and sends them to the linear-operator calculating unit 23 as a generalized Hankel matrix R. Subsequently, for a method of estimating the direction of arrival using the generalized Hankel matrix R, the above-described first or second embodiment may be employed.

$$r_{vN}(k) = E \begin{pmatrix} v_k(t)v_N^*(t) \\ \vdots \\ v_{N-M+k-1}(t)v_N^*(t) \end{pmatrix} \quad (k = 1 \ldots M) \quad (5.2a)$$

$$r_{v1}(k) = E \begin{pmatrix} v_{1+k}(t)v_1^*(t) \\ \vdots \\ v_{N-M+k}(t)v_1^*(t) \end{pmatrix} \quad (k = 1 \ldots M) \quad (5.2b)$$

$$R_{f1} = [r_{vN}(1), \ldots, r_{vN}(M)] \quad (5.3a)$$

$$R_{f2} = [r_{v1}(1), \ldots, r_{v1}(M)] \quad (5.3b)$$

Operation and Advantage of First Variation

In the first variation, the generalized Hankel matrix R is generated from elements of a correlation vector having the N-th and the first complex conjugate components, and the direction of arrival is estimated on the basis of the generalized Hankel matrix R. According to the first variation, although the number of elements of a correlation vector used for generating the generalized Hankel matrix R is smaller than that used in the first and second embodiments, the direction of arrival can be estimated highly precisely by angular estimation using the kernel matrices $\Omega_1$ and $\Omega_2$, such as those shown in Expression 3.12. Furthermore, since the number of processed elements in the correlation vectors is small, the first variation is advantageous in that the amount of calculation is reduced.

Figure 4:
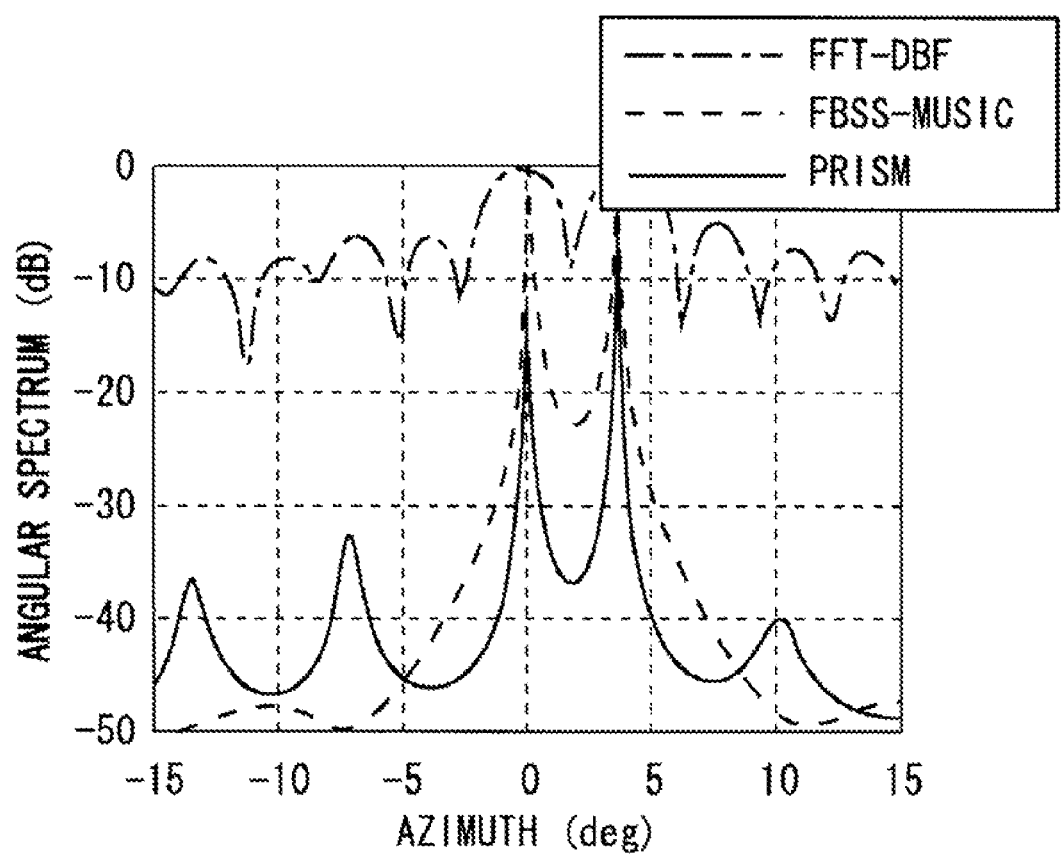
FIG. 4 is graph illustrating an angular spectrum for DOA estimation according to the related art.
Figure 5:
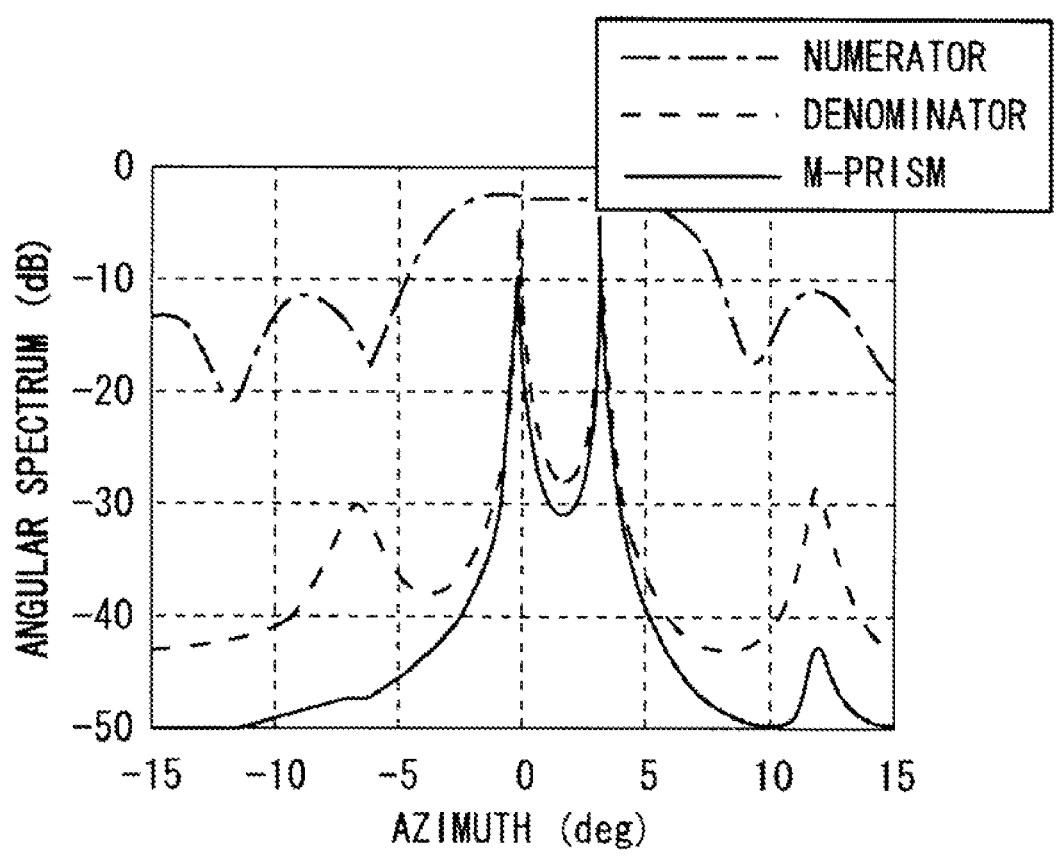
FIG. 5 is graph illustrating an angular spectrum for DOA estimation according to a first variation.

The advantage of the DOA estimation according to the first variation will be described below with reference to FIGS. 4 and 5. FIG. 4 is a graph illustrating an angular spectrum of the DOA estimation according to the related art. FIG. 5 is a graph illustrating an angular spectrum of the DOA estimation according to the first variation. In the simulations illustrated in FIGS. 4 and 5, it is assumed that a first target exists at a zero degree angle at a relative distance of 40 m, and a second target exists at a three degree angle at a relative distance of 40 m. The relative speed of either target is 0 km/h.

FIG. 4 is an angle spectrum for DOA estimation according to the related art and indicates a DBF method (represented as "FFT-DBF"), a MUSIC method (represented as "FBSS-MUSIC"), and a technique disclosed in Patent Document 2 describing the related art (represented as "PRISM"). As illustrated in FIG. 4, according to the related art, although there are apparent peaks at the positions of the first and second targets, there are also spurious peaks due to noise at other points.

FIG. 5 illustrates an angular spectrum of the first variation (represented as "M-PRISM"), an angular spectrum when only the kernel matrix $\Omega_1$ in Expression 3.12 representing submatrices in noise subspace is used as the denominator (represented as DENOMINATOR; the numerator is $a^H(\theta)a(\theta)$, and the angular spectrum is the same as PRISM), and an angular spectrum when only the kernel matrix $\Omega_2$ representing submatrices in signal subspace is used as the numerator (represented as NUMERATOR; the denominator is scalar 1). According to the angular spectrum of the first variation illustrated in FIG. 5, the level of spurious peaks is improved by approximately 15 dB with respect to that in FIG. 4, and the peaks at the positions of the first and second targets are prominent. This is because angular estimation is performed using information about the signal subspace. Specifically, as illustrated in FIG. 5, it is apparent that the spurious peaks due to noise are reduced and the peaks of the estimated target angles are emphasized, since the same mode vector providing the minimum value in noise subspace simultaneously provides the maximum value in signal subspace.

In this way, as in the first variation, even when the number of elements in a correlation vector used for generating the generalized Hankel matrix R is small such as in Patent Document 2, highly precise DOA estimation is possible according to this embodiment. As described in the first and second embodiments, by using a generalized Hankel matrix R having an improved average effect by using even more elements, highly precise DOA estimation is possible.

Second Variation

Figure 6:
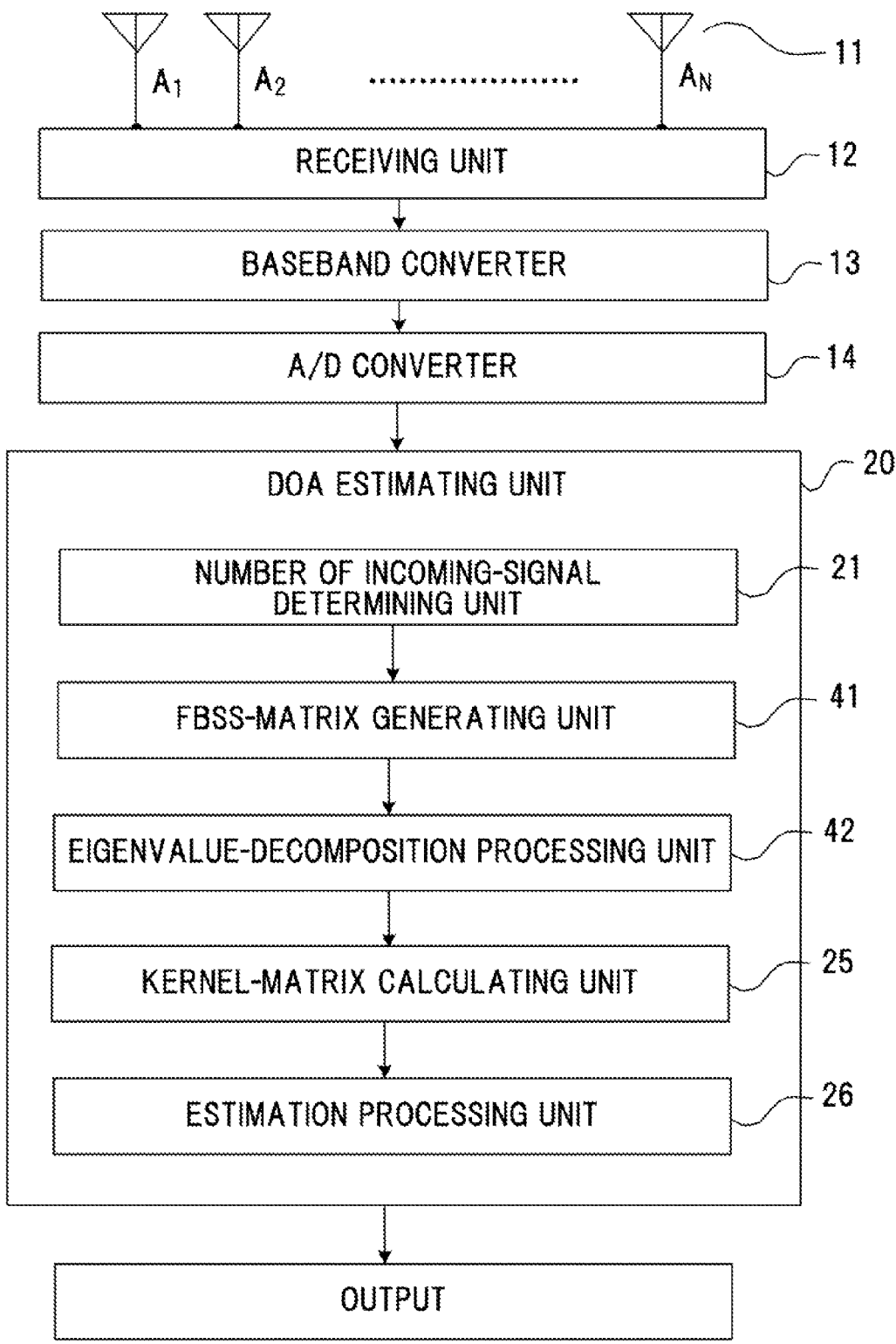
FIG. 6 is block diagram illustrating an angular spectrum for DOA estimation according to a second variation.

FIG. 6 is a block diagram illustrating the configuration of a DOA estimating apparatus according to a second variation. As illustrated in FIG. 6, the DOA estimating apparatus according to the second variation includes a forward-backward-spatial-smoothing (FBSS)-matrix generating unit 41 and an eigenvalue-decomposition processing unit 42 instead of the generalized Hankel-matrix generating unit 22, the linear-operator calculating unit 23, and the propagator-matrix calculating unit 24 in the first embodiment. Other processing blocks in the second variation are the same as those in the first embodiment.

The FBSS-matrix generating unit 41 according to the second variation calculates a covariance matrix $R_{VV}$ from a combined-echo-signal vector v(t) (Expression 6.1). The FBSS-matrix generating unit 41 applies forward-backward spatial-smoothing (FBSS), which is a technique according to the related art, to the matrix $R_{VV}$ to generate an L×L-dimension matrix $R_{VV}^{fbss}$. The FBSS-matrix generating unit 41 sends the matrix $R_{VV}^{fbss}$ to the eigenvalue-decomposition processing unit 42.

$$R_{VV} = E\{v(t)v^H(t)\} = AR_{XX}A^H + \sigma I \quad (6.1)$$

Similar to the multiple signal classification (MUSIC) method, the eigenvalue-decomposition processing unit 42 performs eigenvalue decomposition on the matrix $R_{VV}^{fbss}$ as shown in Expression 6.2 to acquire matrices $E_S$ and $E_N$. The matrix $E_N$ represents a matrix containing eigenvectors which spans noise subspace, and the matrix $E_S$ represent a matrix containing eigenvectors which spans signal subspace. The eigenvalue-decomposition processing unit 42 sends the acquired matrices $E_S$ and $E_N$ to the kernel-matrix calculating unit 25. The subscript N of the matrix $E_N$ does not represent the number of reception antennas N.

$$R_{VV}^{fbss} = E_S \Lambda_S E_S^H + \sigma^2 E_N E_N^H \quad (6.2)$$

The kernel-matrix calculating unit 25 uses the matrices $E_S$ and $E_N$ to calculate kernel matrices $\Omega_1$ and $\Omega_2$ defined by Expressions 6.3 and 6.4, respectively. The dimension L of the unit matrix $I_L$ in Expression 6.4 is L≧(M+1). Subsequently, by using the kernel matrices $\Omega_1$ and $\Omega_2$ calculated in this way by the estimation processing unit 26, DOA estimation is performed in the same manner as that in the first embodiment. Since it is known that the kernel matrices $\Omega_1$ and $\Omega_2$ are orthogonal to each other, descriptions will be omitted.

$$\Omega_1 = E_N E_N^H \quad (6.3)$$

$$\Omega_2 = E_S E_S^H = I_L - E_N E_N^H \quad (6.4)$$

Third Variation

In the DOA estimating apparatus according to the first and second embodiments, the estimation processing unit 26 performs DOA estimation using the kernel matrices $\Omega_1$ and $\Omega_2$. Instead, however, DOA estimation may be performed using only the kernel matrix $\Omega_1$ as shown in Expression 7.1. Even when only the kernel matrix $\Omega_1$ is used, highly precise DOA estimation is possible since the generalized Hankel matrix R for generating the kernel matrix $\Omega_1$ is composed of elements of a correlation vector having multiple complex conjugate components.

$$P(\theta) = \frac{a^H(\theta)a(\theta)}{a^H(\theta)\Omega_1 a(\theta)} \quad (7.1)$$

Hardware Components and Software Components

Hardware components, as used herein, comprise hardware circuits, such as a field programmable gate array (FPGA), an application specific integrated circuit (ASIC), a gate array, a combination of logic gates, a signal processing circuit, and an analog circuit.

Software components, as used herein, comprise parts (pieces) for realizing the above-described processing as software and are not limited to the language used for realizing the software, the development environment, and so on. Software components are, for example, a task, a process, a thread, a driver, firmware, a database, a table, a function, a procedure, a subroutine, a particular section of a program code, a data structure, an array, a variable, and a parameter. These software components are realized by at least one memory and at least one processor (for example, a central processing unit (CPU), a digital signal processor (DSP), or a general purpose graphic processing unit (GPGPU).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the inventions have been described in detail, it should be understood that the various changes, substitutions, and alterations could be made hereto without departing from the spirit and scope of the invention.

What is claimed is:

1. A method for estimating a direction of arrival comprising:
generating a correlation vector of baseband-signal vectors based upon signals received from a plurality of sensor devices;
generating a generalized Hankel matrix R representing a covariance matrix to which a spatial averaging is applied based upon the correlation vector;
generating a kernel matrix $\Omega_1$, which is a projection matrix onto noise subspace, by performing linear operation using submatrices $R_1$ and $R_2$ of the generalized Hankel matrix R;
generating a kernel matrix $\Omega_2$, which is orthogonal with the kernel matrix $\Omega_1$; and
estimating a direction of arrival of a signal based upon the kernel matrices $\Omega_1$ and $\Omega_2$.

2. The estimating method according to claim 1, wherein:
the estimating is based on an angular spectrum defined using one of the kernel matrices $\Omega_1$ and $\Omega_2$ as a numerator and the other as a denominator.

3. The estimating method according to claim 1, wherein:
the estimating is based on an algebraic equation using the kernel matrices $\Omega_1$ and $\Omega_2$.

4. A direction-of-arrival estimating apparatus comprising:
a first matrix generating unit configured to generate a correlation vector of baseband-signal vectors based upon signals received from a plurality of sensor devices, and to generate a generalized Hankel matrix R representing a covariance matrix to which a spatial averaging is applied based upon the correlation vector;
a second matrix generating unit configured to generate a kernel matrix $\Omega_1$, which is a projection matrix onto noise subspace, by performing linear operation using submatrices $R_1$ and $R_2$ of the generalized Hankel matrix R and to generate a kernel matrix $\Omega_2$, which is orthogonal with the kernel matrix $\Omega_1$; and
an estimating unit configured to estimate a direction of arrival of a signal based upon the kernel matrices $\Omega_1$ and $\Omega_2$.

5. The direction-of-arrival estimating apparatus according to claim 4,
wherein the second matrix generating unit includes,
an operator calculating unit configured to calculate a linear operator $\Gamma = (R_1 R_1^H)^{-1} R_1 R_2^H$ using the submatrices $R_1$ and $R_2$ of the generalized Hankel matrix R, where −1 represents an inverse matrix, and H represents a complex conjugate transposition, and
a propagator-matrix calculating unit configured to calculate a propagator matrix $\Pi = [\Gamma, -I]^T$ or an orthogonal propagator matrix $\Pi' = \Pi(\Pi^H \Pi)^{-1/2}$ using the linear operator $\Gamma$ and a unit matrix I, where T represents transposition and −½ represents an inverse of square root ($\sqrt{\ }$), and
wherein the kernel matrix $\Omega_1$ is generated using the propagator matrix $\Pi$ or the orthogonal propagator matrix $\Pi'$.

6. The direction-of-arrival estimating apparatus according to claim 5,
wherein the second matrix generating unit further includes a scaling-matrix calculating unit configured to calculate a scaling matrix $\Lambda = R_2 R_2^H - R_2 R_1^H \Gamma$ using the submatrices $R_1$ and $R_2$ of the generalized Hankel matrix R and the linear operator $\Gamma$, and
wherein the kernel matrix $\Omega_1$ is generated using an inverse matrix of the scaling matrix $\Lambda$ and the propagator matrix $\Pi$ or the orthogonal propagator matrix $\Pi'$.

7. The direction-of-arrival estimating apparatus according to claim 6, wherein the second matrix generating unit generates the kernel matrix $\Omega_1$ by linearly-combining a kernel matrix calculated using the propagator matrix $\Pi$ or the orthogonal propagator matrix $\Pi'$ with a kernel matrix generated using the inverse matrix of the scaling matrix $\Lambda$ and the propagator matrix $\Pi$ or the orthogonal propagator matrix $\Pi'$.

8. The direction-of-arrival estimating apparatus according to claim 4, wherein, when the number of the sensor devices is N and the number of incoming signals received at the sensor devices is M, the first matrix generating unit
extracts, as first subvectors, combinations of continuously arranged (N−M) components, not including autocorrelation components, from subvectors whose elements are correlation vectors of the baseband signals having identical complex conjugate components and at least (N−M) multiple components continuously arranged up to the autocorrelation components,
extracts, as second subvectors, combinations of continuously arranged (N−M) components, not including the autocorrelation components, from subvectors whose elements are the correlation vectors having identical complex conjugate components and at least (N−M) multiple components continuously arranged after the autocorrelation components,
generates a first matrix group and a second matrix group in the order ((N−M)×M) in which the first vectors and the second vectors having identical complex conjugate components are arranged such that components having matching phase relationships are disposed at same element positions, and
generates the generalized Hankel matrix R using at least one of a first matrix $R_{f1}$ generated by adding together the first matrix group and a second matrix $R_{f2}$ generated by adding together the second matrix group.

9. The direction-of-arrival estimating apparatus according to claim 8, wherein the first matrix generating unit uses a first coefficient matrix and a second coefficient matrix for matching magnitudes of vectors between column vectors of the first matrix $R_{f1}$ and the second matrix $R_{f2}$ to calculate a Hadamard product of the first matrix $R_{f1}$ and the first coefficient matrix and a Hadamard product of the second matrix $R_{f2}$ and the second coefficient matrix.

10. The direction-of-arrival estimating apparatus according to claim 8, wherein the first matrix generating unit generates complex conjugate matrices of the first matrix $R_{f1}$ and the second matrix $R_{f2}$, uses the products of the complex conjugate matrices and anti-diagonal unit matrices to generate matrices $R_{b1}$ and $R_{b2}$, and uses the first matrix $R_{f1}$, the second matrix $R_{f2}$, and the matrices $R_{b1}$ and $R_{b2}$ to generate the generalized Hankel matrix R.

11. The direction-of-arrival estimating apparatus according to claim 4, wherein the estimating unit is further configured to estimate on the basis of an angular spectrum defined using one of the kernel matrices $\Omega_1$ and $\Omega_2$ as a numerator and the other as a denominator.

12. The direction-of-arrival estimating apparatus according to claim 4, wherein the estimating unit is further configured to estimate on the basis of an algebraic equation using the kernel matrices $\Omega_1$ and $\Omega_2$.

* * * * *